(12) United States Patent
Hoffman

(10) Patent No.: US 7,969,077 B2
(45) Date of Patent: Jun. 28, 2011

(54) SPARK PLUG WITH AN IMPROVED SEAL

(75) Inventor: John W. Hoffman, Perrysburg, OH (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 11/763,786

(22) Filed: Jun. 15, 2007

(65) Prior Publication Data

US 2007/0290590 A1 Dec. 20, 2007

Related U.S. Application Data

(60) Provisional application No. 60/814,369, filed on Jun. 16, 2006.

(51) Int. Cl.
*H01T 13/38* (2006.01)
(52) U.S. Cl. ...... 313/137; 313/143; 123/169 R
(58) Field of Classification Search ............ 313/141, 313/137, 143; 123/169 R
See application file for complete search history.

(56) References Cited

U.S. PATENT DOCUMENTS

| | | | |
|---|---|---|---|
| 2,898,395 A | 8/1959 | Schurecht | |
| 3,348,091 A * | 10/1967 | Abdella | 313/136 |
| 3,373,724 A * | 3/1968 | Papst | 123/297 |
| 4,112,330 A | 9/1978 | Stimson et al. | |
| 4,173,731 A | 11/1979 | Takagi et al. | |
| 4,795,944 A | 1/1989 | Stimson | |
| 5,304,894 A * | 4/1994 | Stimson | 315/58 |
| 5,549,163 A * | 8/1996 | Sieber | 166/319 |
| 6,320,317 B1 | 11/2001 | Keller et al. | |
| 6,341,501 B2 | 1/2002 | Sugimoto et al. | |
| 6,693,053 B2 * | 2/2004 | Geier et al. | 501/5 |
| 6,852,655 B2 * | 2/2005 | Kodera et al. | 501/32 |
| 7,019,448 B2 | 3/2006 | McMurray et al. | |
| 7,059,926 B2 | 6/2006 | McMurray et al. | |
| 2002/0033659 A1 * | 3/2002 | Nishikawa et al. | 313/118 |
| 2002/0149308 A1 * | 10/2002 | Suzuki et al. | 313/141 |
| 2005/0093411 A1 | 5/2005 | McMurray et al. | |
| 2005/0242694 A1 | 11/2005 | Honda et al. | |

FOREIGN PATENT DOCUMENTS

JP 2004018335 A * 1/2004

* cited by examiner

*Primary Examiner* — Joseph L Williams
*Assistant Examiner* — Fatima N Farokhrooz
(74) *Attorney, Agent, or Firm* — Robert L. Stearn; Dickinson Wright, PLLC

(57) ABSTRACT

A spark plug having a glass seal formed from a first glass material and a second glass material. The first glass material has a glass transition temperature/softening point that is greater than the glass transition temperature/softening point of the second glass material. The first glass material and second glass material form a matrix and when combined with a filler have thermal expansion rates and properties the approximate leaded glass.

33 Claims, 1 Drawing Sheet

SPARK PLUG WITH AN IMPROVED SEAL

CROSS REFERENCE TO RELATED APPLICATIONS

This application claims priority to U.S. Provisional Application Ser. No. 60/814,369, filed Jun. 16, 2006 which is incorporated herein by reference.

BACKGROUND OF THE INVENTION

The present invention relates to a spark plug for a spark-ignited internal combustion engine, and more particularly toward a spark plug having a hermetic seal about a lower center electrode constructed using a lead-free sealing material.

A spark plug is a device that extends into the combustion chamber of an internal combustion engine and produces a spark to ignite a mixture of air and fuel. In operation, electrical potentials of up to about 40,000 volts are applied through the spark plug center electrode, thereby causing a spark to jump the gap between the center electrode and an opposing ground electrode.

Internal resistor/suppressor spark plug designs are well-known and have proven successful over many years. A key element of the successful spark plug design is a hermetic seal between the center electrode and the internal bore of the insulator element of the spark plug. During operation in an engine, the distal portion of the insulator and center electrode will be exposed to the high pressures generated in the combustion chamber, as well as the elevated temperatures generated by the combustion process. A hermetic seal, capable of withstanding the temperatures and gas pressures generated in the combustion chamber over the spark plug lifetime, is essential. The seal must prevent the intrusion of hot, pressurized gases from the combustion chamber into the upper portion of the spark plug, as such gases will damage the discrete resistor/inductor etc. elements and render the spark plug non-functional. In extreme cases, damage may also occur to other related portions of the spark plug (terminal stud) and the engine generally (spark plug wires, etc.).

An exemplary spark plug is illustrated in FIG. 1 having a hermetic glass seal between the insulator and center electrode assembly. The use of such glass seals is well known in the industry as the glass seal provides a hermetic seal to prevent the escaping of various gases from the combustion chamber. Until recently, the glass used in between the insulator and center electrode assembly contained large portions of lead or lead oxide such as taught by U.S. Pat. No. 2,898,395 to Schurecht. In some spark plugs, the lead oxides are 50% by weight or more of the glass sealing material. The use of such substantial amounts of lead is technically desirable, as such leaded glass improves the workability and robustness of the glass seal material and the spark plug. A glass seal material with various lead-containing glasses provided benefits during the manufacturing process including improved fusing of the glass to the surrounding ceramic materials and metal wires at low sealing process temperatures and robust and reliable bonds to ceramic materials. Furthermore, leaded glass bonded well to metals. Another benefit of lead-containing glasses was that as the glass powder was heated, the viscosity of the glass varied minimally with temperature in the process temperature ranges allowing for variability in the manufacturing process without detrimental effect to the resulting spark plugs. All of the above benefits of leaded glass allowed for easy manufacturing of reliable spark plugs.

Due to recent environmental and safety restrictions and legislation in the automotive and glass industries, the use of leaded materials in spark plug construction is no longer desirable, despite the advantages cited. The changes in environmental and safety restrictions have also caused significant increase in the cost use of leaded glass materials. Therefore, most spark plug manufacturers are trying to phase out or limit the amount of lead used in hermetic glass seals between the insulator and center electrode. Therefore, a lead-free glass which: (1) may be processed at temperatures similar to leaded glass, (2) is robust with respect to processing, (3) bonds well to the metals and insulators used in construction of the seal, and (4) uses processes similar to existing process is desirable.

SUMMARY OF THE INVENTION

The present invention is directed to a lead-free glass sealing material for spark plugs. The glass sealing material is formed of a blend of two lead-free glass powders with different glass transition temperatures and softening points. By blending these two lead-free glasses, the resulting glass matrix mimics the desirable characteristics of leaded glass.

The spark plug generally includes a non-conductive glass seal with a mixture of two glass formulations, wherein each of said glass formulations is substantially lead free. The glass material is further substantially free of conductive particles, and forms a hermetic seal between said insulator and said feed-through wire.

The spark plug also includes an insulator, feed-through wire, and a glass seal formed from a first glass powder and a second glass powder, wherein said first and second glass powders have different compositions and wherein the first and second glass powders are substantially lead free. The feed-through wire extends through the glass seal with the glass seal forming a hermetic seal between the insulator and the feed-through wire.

The spark plug may also include a glass seal formed from a first glass material and a second glass material, said first glass material having a first glass transition temperature and said second glass material having a second glass transition temperature.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
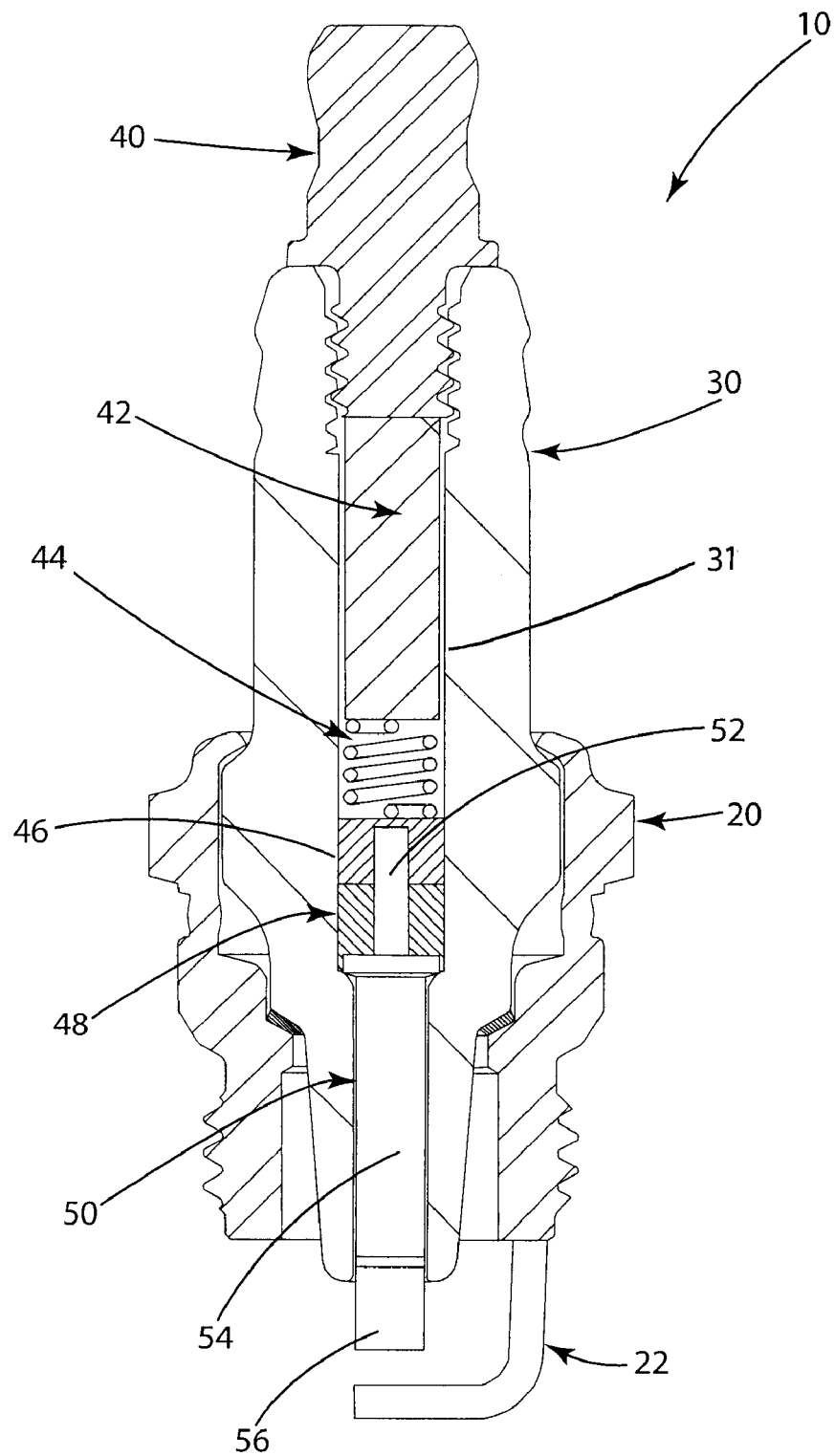
FIG. 1 is a sectional view of a spark plug.

A spark plug 10 is illustrated in the exemplary sectional view of a spark plug in FIG. 1. The present invention may be used with any configuration of a spark plug having a hermetic glass seal between the insulator and center electrode, and the exemplary spark plug show in FIG. 1 is for illustrative purposes. The spark plug 10 includes an outer shell 20 having a ground electrode 22 secured to an insulator 30. The insulator 30 has a central bore 31 in which is situated a terminal 40, a resistor 42, and a spring 44. A conductive material 46 and a glass sealing material 48 provide a seal between the center electrode 50 and the insulator 30. More specifically, the central electrode 50 includes a tip 56 facing the ground electrode 22, a center portion 54, and a feed-through wire 52 which extends through the glass material 48 and into the conductive material 46. The feed-through wire 52 is typically constructed from a low expansion metallic material which has a thermal expansion less than or approximately equal to the ceramic insulator 30. An example of a low expansion material is a material formed from Fe—Ni29Co17. The glass material 48 and conductive material 46 create a seal to hermetically seal the central cavity, and more specifically, provide a seal between the center electrode 50 and the terminal 40 via the feed-through wire 52. The glass material 48 is a non-conductive material, such that the glass seal is not designed as part of the electrode structure to carry current from the terminal end to the firing tip 56. More specifically, the glass material acts as a hermetic seal, and the current is carried by the feed through wire 52. Therefore, the glass material is not part of the circuit and current is passed through the feed-through wire 52.

The glass material 48 is formed out of a first glass material and a second glass material. A filler is also included in the glass material 48 and a binder, such as clay minerals, is also included to act as a binder and to promote expansion during firing. The final product in the spark plug has a glass seal that is a matrix of the first glass material and second glass material combined with the filler as an aggregate. To mimic the properties of leaded glass, the inventors have found that a single lead-free glass material does not work as well as leaded glass, but however, have found that a lead-free glass material having two transition temperatures and softening points can be tuned to mimic the positive properties of leaded glass with minimal negative aspects. Therefore, the first glass material has a different glass transition temperature and softening point than the second glass material. The first glass material is generally formed out of different components and in different amounts of components than the second glass material. The exemplary first glass material may be seen in Table 1 and the target weight percent is exemplary as the first glass material may include a range of any particular element listed in Table 1 and is not limited to the specific weight percent listed.

TABLE 1

First Glass Material Components

| Component | Target (wt %) |
|---|---|
| $SiO_2$ | 21.9 |
| $B_2O_3$ | 38.3 |
| $Al_2O_3$ | 21.6 |
| $Na_2O$ | 0.7 |
| $K_2O$ | 0.25 |
| $Li_2O$ | 5.4 |
| CaO | 0.3 |
| SrO | 11.8 |
| BaO | 0.3 |

While the above Table 1 provides a target weight percentage, these elements may be used within specific ranges. The first glass material include 19% to 24.5% silicon dioxide by weight, preferably 19.9% to 23.9% silicon dioxide, and more preferably 21.4% to 22.4% silicon dioxide by weight. The first glass material may also include 35% to 41% by weight boron trioxide, preferably 36.3% to 40.3% by weight boron trioxide, and more preferably 38% to 38.5% by weight boron trioxide. The first glass material also includes $Al_2O_3$ which typically in the present invention would be present in approximately 19% to 24% by weight, preferably 20% to 23.5% by weight, and more preferably 21% to 22% by weight. The first glass material also includes $Na_2O$ of less than 2%, preferably less than approximately 1.5% and more preferably less than 0.8%. The first glass material typically includes at least 0.1% $Na_2O$ and more particularly 0.5% by weight $Na_2O$. Exemplary glass chemistry of the first glass further includes $K_2O$ in an amount of less than 0.8% by weight, more particularly less than approximately 0.3%, and yet more particularly 0.1% to 0.3%. Also included in the first glass material is $Li_2O$ in the amount of approximately 4% to 7% by weight, particularly 3.4% to 6.4% by weight, and more particularly 4.5% to 6% by weight $Li_2O$. The glass material also includes CaO in the amount of approximately less than 0.8% by weight, particularly less than approximately 0.5% by weight, and more particularly 0.1% to 0.5% by weight. The first glass material includes approximately less than 0.8% by weight BaO, particularly less than 0.5% by weight BaO, and yet more particularly approximately 0.1% to 0.5% by weight BaO. The first glass material may contain SrO in an amount of approximately 7% to 19%, particularly 10% to 15%, and more particularly 10.8% to 12.8% by weight. All of the above elements and ranges of elements are listed as weight percent of the individual component relative to the total weight of the first glass material.

Of course, other elements may be present in the first glass material in trace amounts, such as ZnO, and $ZrO_2$, $TiO_2$, and Iron or $Fe_2O_3$. In general, for purposes of this application, the above elements of which trace amounts may be present are generally present in less than 0.1% by weight and are not deliberately introduced. The glass is substantially free of elements such as Pb, Hg, Cr, and Cd, and these materials are not deliberately introduced to the first glass material. However, the above elements may be present due to manufacturing contamination while not deliberately introduced, but to be considered substantially free of any of these elements the first glass material will have less than 100 ppm of Pb, Hg, Cr, and Cd.

The materials used to form the first glass material are only exemplary and in the above Table 1, the given target and weight percentages are approximate ranges and may vary. The actual components of the glass may also vary. For example, a glass having a similar glass transition and softening temperature may include a maximum, or minimum, or a target weight that is different than the stated range or may have fewer or additional components. The inventors have found that a glass material having the above components and approximately between the above minimum and maximum weight ranges provides a desirable glass transition temperature and softening point when combined with the second glass material, listed below in Table 2.

A glass material having the above materials and weight percentages as found in Table 1 generally has a glass transition temperature and softening point of approximately 520° C. plus or minus 30° C. as measured by a differential scanning calorimeter. The glass material in Table 1 also has a thermal expansion coefficient of approximately 6.2 ppm/° C. for the temperature range of approximately 25 to 260° C. as measured by a dilatometer. The above glass material is formed and processed to have a particle size so that approximately 95% by mass of the glass material may pass through a 200 mesh (U.S. Standard Sieve) in a Sieve test that conforms to ASTM C-92. To allow for better mixing of the glass particles before each of the first and second glass materials are fused together, the inventors have typically had approximately 98% passage rate by mass through a 200 mesh U.S. Standard Sieve.

The second glass material is prepared similar to the first glass material but has properties and materials that are somewhat different. The components forming the exemplary second glass material may be found in Table 2 and the target weight percent is exemplary as the second glass material may include a range of any particular element listed in Table 2 and is not limited to the specific weight percent listed.

TABLE 2

Properties Of Second Glass Material

| Component | Target (wt %) |
|---|---|
| $Bi_2O_3$ | 45 |
| $SiO_2$ | 2.5 |
| $B_2O_3$ | 22.5 |
| ZnO | 27.5 |

The second glass material contains exemplary target weights above and typically the components forming the second glass material have been found to provide excellent glass seal properties when combined with the first material for the following ranges. The following ranges are exemplary and may provide the desired properties outside of the ranges however; the inventors have found that the following exemplary ranges provide glass materials with sufficient desirable properties. The second glass material includes $Bi_2O_3$ in an amount of approximately 40% to 55%, particularly 42% to 50%, more particularly 43% to 48% $Bi_2O_3$. The second glass material minimizes the amount of silicon dioxide ($SiO_2$) present however may include up to 10% silicon dioxide, particularly less than approximately 8%, and yet more particularly less than approximately 5% silicon dioxide by weight. The first glass material may be substantially free of silicon dioxide, however, in the exemplary formulations formed by the inventors, the inventors have found that a second glass material with at least 0.5%, particularly 1%, and more particularly at least 2% provides a glass material having substantially desirable characteristics as a glass seal when combined with the above first glass material. The second glass material also includes approximately 20% to 35% by weight $B_2O_3$, particularly 21% to 29% by weight $B_2O_3$, more particularly 21% to 27% by weight $B_2O_3$, and yet more particularly 21% to 24% by weight $B_2O_3$. The second glass material also includes less than 1% by weight $Al_2O_3$, particularly less than 0.3% by weight $Al_2O_3$, and yet more particularly less than 0.1% by weight $Al_2O_3$. The second glass material also includes approximately 23% to 33% by weight ZnO, particularly 25% to 30% ZnO, more particularly 26% to 29% by weight ZnO, and yet more particularly 27% to 28% by weight ZnO. The above ranges are given in weight percent of the individual elements against the total weight of the second glass material.

Of course, other elements may be present in the first glass material in trace amounts, such as $ZrO_2$, $TiO_2$, and Iron or $Fe_2O_3$. In general, for purposes of this application, the above elements of which trace amounts may be present are generally present in less than 0.1% by weight and are not deliberately introduced. The second glass material is substantially free of elements such as Pb, Hg, Cr, and Cd and these materials are not deliberately introduced to the second glass material. However, the above elements of which the glass is substantially free of, may be present due to manufacturing contaminations while not deliberately introduced by to be considered substantially free of any of these elements the second glass material will have less than 100 ppm of any of these elements (Pb, Hg, Cr, and Cd).

As with the first glass material, the second glass material may also vary by a percentage of weights and the included components. The inventors have found that the exemplary second glass material having the components in Table 2 or within given ranges above provides a desirable second glass transition temperature and softening point when used with the exemplary first glass material.

The exemplary second glass material has a glass transition temperature of approximately 490° C. plus or minus 30° C. as measured by a differential scanning calorimeter. The exemplary second glass material has a glass transition temperature that is lower than the first glass transition temperature. The ranges for the first glass transition temperature and softening point and the second glass transition temperature and softening point approximately abut or overlap slightly in the given exemplary materials. However, this abutment is not necessary but the glass transition temperatures should not be more than approximately 70° C. apart. The particle size of the second glass material is substantially similar to the particle size of the first glass material. In manufacturing of the spark plug, the powders of the first glass material, second glass material, and a filler are placed into a cavity on the insulator. The spark plug is then fired causing the glass materials to fuse into a matrix. In the exemplary glass seals made by the inventors using the exemplary first and second glass materials, the matrix of the glass seal had a material composition of approximately the component and weight percent amounts found in Table 3 below.

TABLE 3

Approximate Matrix Chemistry Of Combined Glass Materials After Firing

| Component | Matrix (wt %) |
|---|---|
| $SiO_2$ | 16.1 |
| $B_2O_3$ | 31.9 |
| $Al_2O_3$ | 14.7 |
| $Bi_2O_3$ | 15.6 |
| $Na_2O$ | 0.4 |
| $K_2O$ | 0.2 |
| $Li_2O$ | 3.6 |
| CaO | 0.2 |
| MgO | 0.05 |
| SrO | 7.4 |
| BaO | 0.2 |
| ZnO | 9.5 |
| Other Impurities | Less than 1% |

Of course the amounts in Table 3 may vary substantially depending upon the amounts of each of the exemplary first and second glass materials used. The target composition provided in Table 3 is only for the combination of the first and second glass materials in an exemplary glass sealing mixture and do not include any of the filler which may be added to the glass seal.

A filler may also be used in the glass seal. The filler generally should have a thermal expansion coefficient that is less than the glass materials and ceramic insulator. The filler is generally a crystalline oxide material and therefore does not have a glass transition temperature. Therefore the filler is found mixed individually as particles within the glass matrix upon fusing and in most instances forms plainly visible chunks within the glass matrix. The preferred filler generally has components with the approximately percentages by weight in Table 4. The particle size of the filler is similar to the particle sizes of the glass materials. Of course, the filler may vary and other fillers with similar properties may be used.

TABLE 4

Filler Properties

| Component | Target (wt %) |
|---|---|
| $SiO_2$ | 55 |
| $Al_2O_3$ | 32.5 |
| MgO | 12.5 |
| BaO | 2.5 |

The filler typically forms 10-40% by weight of the glass seal and more particularly 20-30% and yet more particularly 24-26%. The filler includes silicon dioxide ($SiO_2$) which may be present in an amount of 50% to 60% by weight of the filler and more particularly 53% to 57% by weight of the filler. The filler also may include $Al_2O_3$ which is present in an amount of 30% to 35%, and more particularly 31% to 33% by weight. Another element compound included typically in the filler is MgO which is typically present in an amount of 10% to 15% and more particularly 11% to 14% by weight of the filler. The filler may also include BaO in an amount of approximately up to 4%.

The glass seal forms a hermetic seal through which passes the feed through wire. More particularly, the glass seal forms a hermetic seal between the insulator and the feed through wire and is formed of a non-conductive material and does not include, as in known conductive glass seals, particularly conductive particles. Furthermore, the glass seal is formed as a single layer even thought it includes two glass materials. The first glass material forms approximately 40% to 55% by weight of the glass seal and more particularly 46% to 48% by weight. Table 5 illustrates the various glass materials used in percentages by weight including weight percent by filler of the glass seal. Table 5 also illustrates whether or not the seal properly sealed to form a hermetic seal between the insulator and the feed through wire.

feed through wires such as Kovar may also oxidize at temperatures when fired above 700° C. As one skilled in the art would know, low temperature firing of a spark plug is desirable to prevent this oxidation and the inventors are not aware of any substantially free of lead glass seals or any glass seals where lead is not deliberately added to the glass seal which is fired to form a hermetic seal between a feed through wire and an insulator at a temperature of 750° C. and more particularly 700° C. or below. As illustrated in Table 5 the seal also may be made for certain glass compositions at 650° C. and at times even made at 600° C. Having a lower firing temperature prevents oxidation and also helps provide a better hermetic seal. As used in Table 5, $T_{Expand}$ temperature at which the glass seal material will spontaneously expand during firing, as measured using a vertical push-rod type dilatometer. This tends to increase as filler is added, and decreases as the lower glass transition temperature frit is added. Expansion is necessary during the firing process to fill the insulator bore entirely. It is caused by the glasses softening and becoming fluid, allowing gases released by the clays etc. to be trapped and create pressure within the fluid glass materials. This results in the necessary vesicular structure in the finished product. The alternative is that the part is slumping—indicated by decreasing height/increasing diameter. This indicates that the seal will not adequately fill space at the process temperature, and also that the glass is soft enough to disrupt formation of the vesicular structure.

In Table 5, Fired CTE (Coefficient of Thermal Expansion) ppm/C or parts per million per degree C is measured using a vertical push-rod type dilatometer on the pellets which are first fired to the sealing temperature and then cooled to consolidate the material, and then reheated to measure the expansion of the fired material. The CTE was measured during heating on the second firing, over the range 50-300° C.

In Table 5, Expand @ 650 C means that the cylindrical pellets of the granular material are pressed using a manual hydraulic press, and are heated at 650 C in a furnace at various temperatures, for 10 minutes. If the height of the pellet increases more than the diameter, the pellet is judged to be expanding at the 650 C test temperature, which approximates the sealing temperature in a production environment.

TABLE 5

Exemplary Glass Seals

| Glass ID | Glass 1 (wt %) | Glass 2 (wt %) | Filler F (wt %) | $T_{Expand}$ (° C.) | Fired CTE (ppm/° C.) | Expand @ 650° C. | Seal @ 625°-650° C. |
|---|---|---|---|---|---|---|---|
| 06-GS-10 | 35.7 | 56.5 | 7.8 | 582 | 7.0 | 0.82 - Yes | No |
| 06-GS-11 | 59.7 | 23.6 | 16.7 | 607 | 6.4 | 0.98 - — | No |
| 06-GS-12 | 42.2 | 35.8 | 22.0 | 605 | 5.4 | 1.03 - — | Yes |
| 06-GS-13 | 14.0 | 55.4 | 30.7 | 602 | 4.3 | 0.89 - Yes | Yes |
| 06-GS-14 | 65.2 | 9.2 | 25.5 | 615 | 6.3 | 0.92 - Yes | Yes |
| 06-GS-15 | 54.9 | 36.2 | 8.9 | 598 | 7.4 | 1.07 - No | No |
| 06-GS-16 | 38.7 | 46.8 | 14.5 | 595 | 7.0 | 1.00 — | No |
| 06-GS-17 | 29.8 | 35.4 | 34.8 | 616 | 4.8 | 0.85 - Yes | Yes |
| 06-GS-18 | 50.6 | 9.1 | 40.3 | 632 | 4.4 | 0.84 - Yes | Yes |
| 06-GS-19 | 24.7 | 55.9 | 19.4 | 589 | 6.6 | 1.06 - No | Yes |
| 06-GS-20 | 80.3 | 9.4 | 10.4 | 613 | 7.1 | 0.90 - Yes | Yes |
| 06-GS-21 | 46.1 | 23.3 | 30.6 | 620 | 5.0 | 1.02 — | Yes |
| 06-GS-22 | 27.1 | 46.3 | 26.6 | 606 | 5.1 | 0.90 - Yes | Yes |

It is important to note that the inventor's have produced a glass seal which may form a hermetic seal below 700° C. As is well known in the art, the brass plug 46 located above the glass seal 48 may oxidize at temperatures above 700° C. Also, the feed through wire formed from materials typically used in In Table 5, Seal @ 625-650 C means that after firing test spark plugs in a lab furnace for a 25 minute soak at 625 and/or 650 C, the parts are subjected to a static 800 psig air pressure for 10 seconds. If no leakage of the air through the seal is recorded by an attached manometer or differential pressure gage, the parts are judged to have sealed successfully. This result indicates which glasses above are desirable/preferred.

The spark plug is manufactured through a generally well known process. The outer shell, ground electrode 22, insulator 30, terminal 40, resistor 42, spring 44, and center electrode 50 are generally formed as well known in the art. The glass material 48 includes the first glass material, the second glass material, and the filler. Each of the first glass material, second glass material, and filler are generally processed to obtain predominately particles of the desired size. The first glass material, second glass material, and filler are then combined and wet ground to form a slurry. The slurry is then spray dried to granulate the particles. The slurry forms droplets with water that then flashes off in the heated spray dryer leaving small spherical granular particles made up of smaller particles of the first and second glass materials and the filler. These granules are easier to handle, have reduced dusting, and are easier to place within the cavity on the ceramic insulator.

With the center electrode in place on the insulator, the granules of first and second glass material and filler are added to the specified depth and compressed around the metal feed-through wire. The conductive material is then added to the top of the glass material 48 and compressed. The insulator containing the center electrode, glass material 48, and conductive material 46 is then fired so that the glass material 48 fuses the first and second glass materials together around portions of the filler. The fused glass material 48 bonds both to the center electrode 50 as well as to the insulator 30. The bonded glass material 48 forms a hermetic seal with the insulator 30 and center electrode 50.

More specifically, the glass material formed of the first glass material, second glass material, and filler are typically provided as the spray dried powder desired above. This powder composed of larger granules is formed from smaller particles of the ingredients is placed in the spark plug and heated to form a seal. During heating to an appropriate temperature, the glass powders, bentonite and lithium carbonate, form a continuous matrix approximated by the exemplary composition listed in Table 3. The filler is a refractory material in a crystalline form and therefore does not melt during the heating process. It thus essentially maintains the chemistry and properties listed in Table 4.

The inventors have found that by using the two glass materials with the above listed properties and the exemplary filler, a thermal expansion rate of the mixture after heating is intermediate, between that of the insulator and the feed through materials. This allows both the insulator-glass and glass-feed through interfaces to be placed in compression during cooling, minimizing undesirable tensile stresses on the interfaces. By minimizing the thermal stress, a more robust seal is created.

Another benefit to the present invention is that the glass material 48 is able to form a vesicular structure during the sealing process. This vesicular structure is accomplished when a material in the starting powder (lithium carbonate or bentonite) generates gas, at a temperature at or slightly above the glass transition temperature/softening point of the individual glass powders (first glass material and second glass material). While this vesicular structure is easily accomplished with leaded material because the leaded material's viscosity is minimally sensitive to temperature at the sealing point, it is not typically true with non-leaded glasses which are more temperature sensitive. By blending the first glass material with the second glass material as done in the present invention with each glass material having a different transition temperature/softening point, the behavior of the combined glass materials mimics the behavior of leaded glass by allowing gas to be trapped with the molten material thereby expanding and filling the space to create a better seal. Thus, the blend of the first glass material and second glass material is beneficial to forming the vesicular structure and improves the ability of the blended glass materials to form a hermetic seal. After firing, the first glass material and second glass material form a solid fill material with surrounding discrete particles of filler material. In other words, the solid glass material forms a continuous glassy matrix of the first and second glass materials with individual particles of filler surrounded by the glassy matrix. The glass material also may contain fine pores present in approximately 10% to 30% by volume. It has been found that the pores are generally not interconnected but are isolated within the glassy matrix.

As two different glass materials with differing glass transition temperatures and softening points is important to forming the glass material that mimics leaded glass, the inventors have found that the glass transition temperature point/softening points should be approximately 10 to 50° C. apart. Furthermore, the inventors have found that it is beneficial to use less, as a percent by weight of the final composition, of the glass material having the lower transitioning temperature/softening point. More specifically, in the present invention, the glass material with the lower glass transitioning temperature/softening point will generally have less material by weight percent than the glass with the higher glass transitioning temperature/softening point. Although specific materials and ranges are given for the first glass material and second glass material as well as the filler, it is expected that a wide range of fillers and glass materials may be used so long as the transitioning points differ as by the above described ranges as well as that the glass material with a lower glass transitioning temperature/softening point is used in less quantity than the glass with the higher glass transitioning temperature/softening point.

The filler primarily modifies the glass materials 48 thermal expansion after firing. The filler also serves to toughen the glass matrix after firing, while also controlling the expansion during firing. It is likely that other commercially available low expansion fillers may be used in place of the suggested filler. The filler generally should have a thermal expansion less than or equal to both the ceramic insulator and the glass matrix. Desirable properties of alternate oxide fillers would include (1) not electrical conductive (2) thermal expansion less than both the insulator body and the glasses used in the glass seal material (3) sizing −200 mesh (4) able to bond with the glass matrix to prevent separation and glass leakage (5) dense and generally non-porous, to prevent gas entrainment during processing, and excessive outgassing during firing. Potential materials would include but not be limited to oxide glasses, spodumene, beta-eucriptyte, mullite, cordierite and similar well-known to those in the art.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:
1. A spark plug comprising:
an insulator having a central bore;
a feed-through wire disposed in said central bore;
a non-conductive glass seal between the insulator and the feed-through, wherein said glass seal has a vesicular structure and is a fused or sintered glass matrix of substantially lead free first and second glass materials;

said first glass material including, in % by weight relative to the total weight of the first glass material, 19% to 24.5% $SiO_2$, 35% to 41% $B_2O_3$, and 19% to 24% $Al_2O_3$;

said second glass material including, in % by weight relative to the total weight of the second glass material, 40% to 55% $Bi_2O_3$, 0.5% to 10% $SiO_2$, 20% to 35% $B_2O_3$, and 23% to 33% ZnO;

said first glass material having a first glass transition temperature and said second glass material having a second glass transition temperature, wherein the first glass transition temperature is 10 to 50 degrees Celsius apart from the second glass transition temperature.

2. The spark plug of claim 1 wherein said first glass material has a glass transition temperature of approximately 505-535 degrees Celsius.

3. The spark plug of claim 1 wherein said first glass material has a thermal expansion coefficient of approximately 6.2 ppm per degree Celsius, measured with the temperature being in the range of approximately 25-260 degrees Celsius.

4. The spark plug of claim 1 wherein each of said first and second glass materials have a particle size of less than 200 Mesh (US Standard Sieve) for approximately 95% by weight of each of said first and second glass powders, respectively.

5. The spark plug of claim 1 wherein said first glass material includes less than approximately 2% by weight $Na_2O$.

6. The spark plug of claim 1 wherein said first glass material includes less than approximately 0.8% by weight $K_2O$.

7. The spark plug of claim 1 wherein said first glass material includes approximately 4% to 7% by weight $Li_2O$.

8. The spark plug of claim 1 wherein said first glass material includes less than approximately 0.8% by weight CaO.

9. The spark plug of claim 1 wherein said first glass material powder includes less than approximately 0.8% by weight BaO.

10. The spark plug of claim 1 wherein said first glass material includes 0.1% to 1.3% TiO2.

11. The spark plug of claim 1 wherein the glass seal further includes clay mineral binder.

12. The spark plug of claim 1 wherein said first and second glass materials each include individually less than 100 ppm of Lead, Mercury, Chromium, and less than 70 ppm Cadmium.

13. The spark plug of claim 1 wherein said matrix occurs upon heating said glass powders to a temperature of less than 750 degrees Celsius.

14. The spark plug of claim 1 wherein said glass seal further includes up to 5% by weight bentonite.

15. The spark plug of claim 1 wherein said first glass material includes approximately 5% to 17% by weight SrO.

16. The spark plug of claim 1 wherein said second glass material includes less than 1% by weight $Al_2O_3$.

17. The spark plug of claim 1 wherein said first glass material has a transition temperature within 50 degrees Celsius of the glass transition temperature of said second glass material.

18. The spark plug of claim 1 wherein said second glass material has a transition temperature of at least 10 degrees Celsius greater than the glass transition temperature of said second glass material.

19. The spark plug of claim 1 wherein said second glass material has a transition temperature of approximately 475 degrees Celsius to about 505 degrees Celsius.

20. The spark plug of claim 1 wherein said second glass material has a thermal expansion coefficient of approximately 6.4 ppm per degree Celsius, measured with the temperature being in the range of in the range of approximately 25 degrees to 260 degrees Celsius.

21. A spark plug comprising:
an insulator having a central bore; and
a non-conductive glass seal disposed in said bore and having a vesicular structure and formed from a first glass material and a second glass material;

said first glass material including, in % by weight relative to the total weight of the first glass material, 19% to 24.5% $SiO_2$, 35% to 41% $B_2O_3$, and 19% to 24% $Al_2O_3$;

said second glass material including, in % by weight relative to the total weight of the second glass material, 40% to 55% $Bi_2O_3$, 0.5% to 10% $SiO_2$, 20% to 35% $B_2O_3$, and 23% to 33% ZnO;

said first glass material having a first glass transition temperature and said second glass material having a second glass transition temperature, wherein said first glass transition temperature is at least 10 degrees Celsius greater than said second glass transition temperature.

22. The spark plug of claim 21 wherein said first glass transition temperature is no more than 50 degrees Celsius greater than said second glass transition temperature.

23. The spark plug of claim 21 wherein said first glass transition temperature is from 10-50 degrees Celsius greater than the second glass transition temperature.

24. The spark plug of claim 21 wherein said glass seal includes more of said first glass material than said second glass material by weight.

25. The spark plug of claim 21 wherein said glass seal includes at least 10 percent more of said first glass material than said second glass material by weight.

26. The spark plug of claim 21 wherein said first glass material is approximately 35% to 65% by weight and said second glass material is approximately 10-35% by weight.

27. The spark plug of claim 21 wherein said glass seal further includes a filler, said filler being approximately 15% to 26% by weight.

28. The spark plug of claim 27 wherein said filler is approximately 20% to 23% by weight.

29. The spark plug of claim 21 wherein said first glass material is approximately 45% to 55% by weight.

30. The spark plug of claim 21 wherein said second glass material is approximately 22% to 30% by weight.

31. The spark plug of claim 21 wherein said first glass material is approximately 48% to 50% by weight and said second glass material is approximately 26% to 28% by weight.

32. The spark plug of claim 21 wherein said glass seal further includes lithium carbonate.

33. The spark plug of claim 27 wherein said filler is an inorganic filler with a thermal expansion rate that is approximately less than or equal to the thermal expansion rate of either the first glass material or the second glass material.

* * * * *